United States Patent
Tanioka (10) Patent No.: US 6,456,792 B2
(45) Date of Patent: Sep. 24, 2002

(54) LENS BARREL

(75) Inventor: Hiroshi Tanioka, Kashiwa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/903,578

(22) Filed: Jul. 13, 2001

(30) Foreign Application Priority Data

Jul. 13, 2000 (JP) ........................................ 2000-212519

(51) Int. Cl.$^7$ ........................... G03B 5/00; G03B 13/32; G02B 7/02; G02B 15/14
(52) U.S. Cl. ........................ 396/79; 359/684; 359/695; 359/700; 359/701; 359/826
(58) Field of Search ....................... 396/79–83; 359/684, 359/694, 695, 699, 700, 701, 826, 823

(56) References Cited

U.S. PATENT DOCUMENTS 5,854,712 A  * 12/1998  Okano ........................ 359/823

* cited by examiner

*Primary Examiner*—W. B. Perkey (57) ABSTRACT

A lens barrel is provided with a front lens group facing a subject, that moves only during zooming, and an internal focusing lens group, different from the front lens group, moving at least during focusing. A first cam ring having a cam groove for causing the front lens group to move, and a second cam ring that is separate from the first cam ring, is driven by the same drive source as the first cam ring, rotates together with the first cam ring, and has a cam groove for causing lens groups other than the front lens group to move, are also provided.

15 Claims, 3 Drawing Sheets

LENS BARREL

INCORPORATION BY REFERENCE

The disclosure of the following priority application is herein incorporated by reference:

Japanese Patent Application No. 2000-212519 filed Jul. 13, 2000.

BACKGROUND OF THE INVENTION

1. Field of the Invention

The present invention relates to a lens barrel equipped with a lens group and lens frame provided at a front row and being capable of moving during zooming.

2. Related Art

Figure 3:
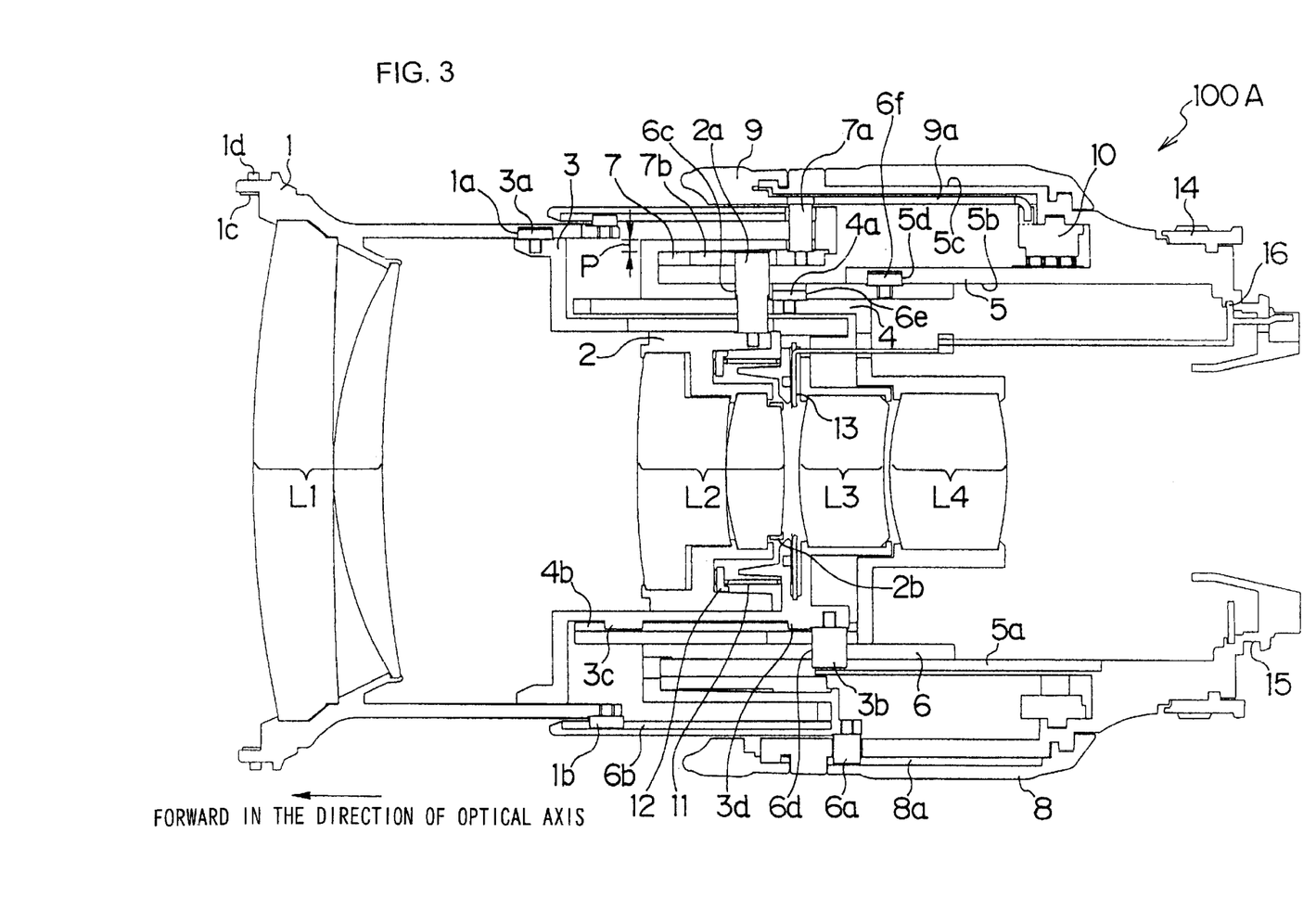
FIG. 3 is a cross-sectional view of a lens barrel in related art.

As shown in, for example, FIG. 3, lens barrels are equipped with lens groups for performing focusing and zooming. A lens barrel 100A has a photographing optical system comprising a first lens group L1, a second lens group L2, a third lens group L3 and a fourth lens group L4. Each lens group is supported by a corresponding lens moving frame so as to move backwards and forwards along the optical axis.

The fourth lens group L4 is a zooming lens group for adjusting the focal length of the entire photographing optical system. The second lens group L2 is a focusing lens group for adjusting the focusing state of the photographing optical system. The photographing optical system of this lens barrel is a so-called internal focusing optical system.

A zoom operation ring 8 is manually rotated when the focal length is adjusted. Rotation of the zoom operation ring 8 is then transmitted to a cam tube 6. The cam tube 6 links with the zoom operation ring 8 and moves along the optical axis while being rotated. A plurality of cam grooves 6c, 6d and 6e are provided in the cam tube 6. Rotation of the cam tube 6 is transformed into movement in the optical axis direction by pins 2a, 3b and 4a corresponding in a respective manner to the plurality of cam grooves 6c, 6d and 6e. As a result, a moving frame 2 of the second lens group L2, a moving frame 3 of the third lens group L3 and a moving frame 4 of the fourth lens group L4 do not rotate and there is movement towards the front and rear along the direction of the optical axis.

The cam tube 6 is provided with a cam groove 6b. The cam groove 6b engages with a cam pin 1b provided at the outer periphery of the first lens group moving frame 1. As a result, the first lens group moving frame 1 rotates together with the cam tube 6. Rotation of the first lens group moving frame 1 is therefore transformed into movement in the direction of the optical axis due to the cam 1a and the pin 3a. The first lens group moving frame 1 therefore moves towards the front and to the rear of the optical axis while rotating.

The aforementioned cam tube 6 is folded in the manner shown in FIG. 3. A folding portion of thickness P is only for connecting the innermost part and outermost part of the cam tube 6. A certain amount of strength is required in order to transmit drive force and the thickness P of the fold cannot be made thinner. Namely, the lens barrel, and particularly the diameter of the lens barrel, cannot be made smaller.

The shape of the cam tube 6 is therefore complex in order to achieve this folding. It is extremely difficult to make a part in the shape of the cam tube 6, and the cost of manufacturing the parts is expensive. When the cam tube 6 is made in the manner of plastic molding, the shapes of the parts are complex and the shape of the mold is therefore complex, which means the cost of producing the mold is high. It is also difficult to ensure precise dimensions for the parts formed using a plastic mold. This causes both productivity to fall and molding costs to increase.

When performing focus adjustment, the moving together of the first lens group moving frame 1 and the first lens group along the direction of the optical axis during rotation has the following disadvantages.

When a polarizing filter used in adjusting the angular position of a polarizing plate is fitted to the lens barrel, the angle of the polarizing filter is set in such a manner that optimum light polarizing characteristics are obtained for a certain focal length. However, when the focal length is adjusted, the filter also rotates together with the first lens moving frame 1. The angle set for the polarizing filter therefore changes and it is therefore necessary to re-adjust the angle of the polarizing filter.

When a hood is mounted on the lens barrel, the hood shape is limited by necessity to being a circular hood that can be rotated about the optical axis. When the circular hood is used with a zoom lens, particularly with a high magnification zoom lens including a wide angle region, it is necessary to employ a shallow hood to ensure that shading of the light rays does not occur at the four corners of the screen at the wide angle end. This means that a sufficient effect of blocking harmful light is not obtained.

Further, when the lens is rotated about the optical axis of the lens, if the properties of the lens included in the lens barrel are uneven, the optical characteristics of the whole of the lens barrel deteriorate. As with the lens barrel 100A, when the first lens group L1 rotates, the optical performance of the whole lens barrel, i.e. the resolving power, changes depending on the focal length, and this creates instability.

There are also lens barrels for the internal focusing zoom lens where the front first lens group does not rotate while moving along the direction of the optical axis. Rotation of the first lens group and the first lens moving frame is limited by a fixed member. As a result, the range by which the first lens group and the first lens moving frame can be moved is the length in the optical axis direction of the member fixed in order to limit rotation. Thus, the stroke by which the first lens group moves is not long, this lens barrel is applicable to zoom lenses of relatively low magnification factors. Namely, the stroke by which the first lens group can move is defined by the length of the member fixed in order to limit rotation, and it is therefore difficult to provide a small type zoom lens with a high magnification factor.

SUMMARY OF THE INVENTION

A first object of the present invention is to provide a small, low-cost lens barrel that can be used for a high-magnification zoom lens.

A second object of the present invention is to provide a small, low-cost lens barrel that can be used for a high-magnification zoom lens where a front lens group does not rotate.

A lens barrel of the present invention is provided with a front lens group facing a subject and moving only during zooming, and an internal focusing lens group that is different from the front lens group, and moves at least during focusing. In order to achieve the first object, a first cam ring having a cam groove for causing the front lens group to move, and a second cam ring that is different from the first cam ring, is driven by the same drive force as the first cam ring, rotates together with the first cam ring, and has a cam groove for causing lens groups other than the front lens group to move, are also provided.

In order to achieve the second object, there is provided a front moving frame for supporting the front lens group, and a rectilinear moving member for guiding the front moving frame in a rectilinear manner, and providing rectilinear movement without rotation during zooming.

The front moving frame can move as a result of zooming to a position where there is no overlapping with a member that does not move during zooming.

The rectilinear moving member can be a moving frame for supporting a lens group different from the front lens group and the internal focusing lens group.

It may be provided with a focus interlocking barrel constituted by a cylindrical member, which is provided in such a manner as to fit in a slidable manner with the fixed barrel, freely rotate about the optical axis with respect to the second cam ring, and move together with the second cam ring in the thrust direction, and transmits driving power to the internal focusing group by rotation about the optical axis during focusing, and limits rotation of the internal focusing lens group without rotating during zooming so as to provide rectilinear guidance.

The fixed barrel may be provided with a cam groove and a zoom operation ring fitted in a rotatable manner to the outer periphery of the fixed barrel, having a rectilinear guide at an inner periphery, and being operated during zooming. The first cam ring fitted in a rotatable manner to the fixed barrel may have an engaging member engaging with the cam groove of the fixed barrel, that engages with the rectilinear guide of the zoom operation ring so as to move by receiving rotating force of the zoom operation ring so as to move.

The second cam ring may comprise a rectilinear groove. The zoom operation ring can also have a hook, engaging with the rectilinear groove of the second cam ring, and transmitting rotational force to the second cam ring.

The front moving frame can comprise a guide frame member having a rectilinear guide member engaging with the rectilinearly moving member, filter fitting screws and/or an accessory fitting member, and a front lens group supporting member for supporting the front lens group. The guide frame member and the front lens group support member may comprise a position restricting member for limiting a fitting position of the front lens group support member with respect to the guide frame member. The position restricting member may be provided at a position corresponding to the guide frame member and a position rotated centrally about the optical axis from the position corresponding to the guide frame member so as to limit the position of fitting the front lens group supporting member with respect to the guide frame member.

The position restricting member may be provided at a position corresponding to the guide frame member and a position rotated centrally by 180 degrees about the optical axis from the position corresponding to the guide frame member so as to limit the position of fitting the front lens group supporting member with respect to the guide frame member.

The accessory fitted to the accessory fitting member is preferably a flower-shaped hood.

DETAILED DESCRIPTION OF THE PREFERRED EMBODIMENTS

Figure 1:
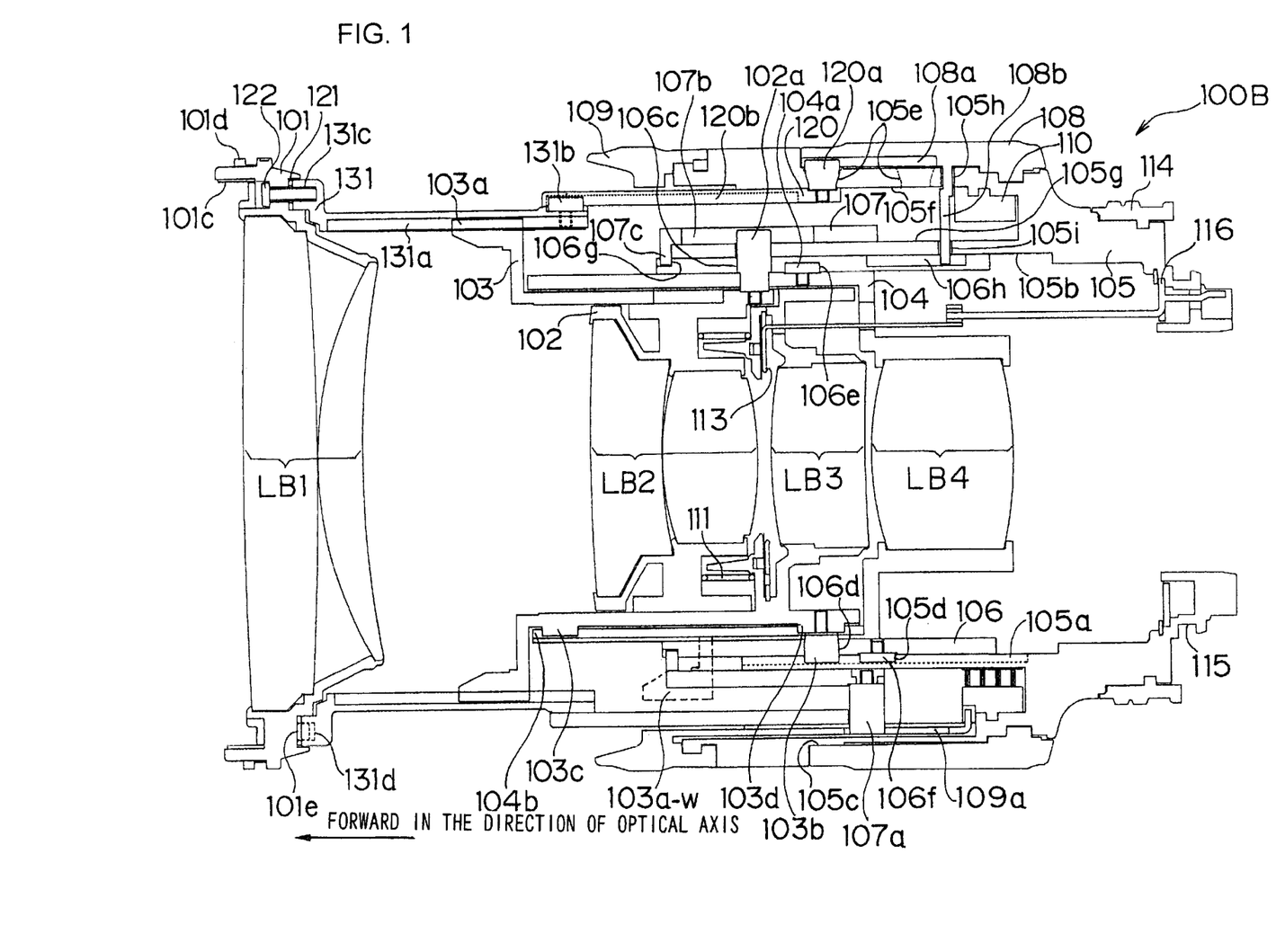
FIG. 1 is a cross-sectional view at a telescopic end of a lens barrel 100B of an embodiment of the present invention.

FIG. 1 is a cross-sectional view at a telescopic end of a lens barrel 100B of an embodiment of the present invention. The lens barrel 100B is applied to a high magnification zoom lens with a high zoom ratio, which performs internal focusing. The first lens LB1 of the lens barrel 100B of the present invention is movable backwards and forwards along the optical axis without being rotated.

The lens barrel 100B has a photographing optical system comprising four lens groups, namely, a first lens group LB1, a second lens group LB2, a third lens group LB3 and a fourth lens group LB4. The first lens group LB1 is a front lens group provided on the subject side, is supported by a first group lens chamber 101, and can be moved backwards and forwards along the direction of the optical axis. The second lens group LB2, third lens group LB3 and fourth lens group LB4 are supported by a second group lens moving frame 102, a third group lens moving frame 103, and a fourth group lens moving frame 104, respectively, and can be moved backwards and forwards along the direction of the optical axis.

The second lens group LB2 is an internal focusing lens group moved during focusing. The lens barrel 100B of the preferred embodiment of the present invention is an internal focusing type lens barrel where only the second lens group LB2 moves during focusing. The fourth lens group LB4 is a zooming lens group for adjusting the focal length of the entire photographing optical system.

The first group lens chamber 101 constitutes a front lens supporting member for supporting the first lens group LB1, and is fixed to the front end of a guide barrel 131 using a plurality of screws 122. The first group lens chamber 101 is equipped with a filter fitting screw 101c provided at a front end and an accessory fitting screw 110d for fitting a hood, etc. The first group lens chamber 101 has a projection 101e for limiting the position of the direction of rotation centered about the optical axis, with respect to the guide barrel 131.

The guide barrel 131 is a guide frame member having a cam pin 131b at an outer periphery and a rectilinear guide groove 131a at an inner periphery. The cam pin 131b is installed in such a manner as to be capable of sliding in a cam groove 120b of a first cam ring 120. A key projection 103a provided at the third group lens moving frame 103 is fitted in a slidable manner into the rectilinear guide groove 131a.

The guide barrel 131 is provided with positioning holes (position restricting units) 131d for restricting an angular position in a circumferential direction at a position corresponding to the projection (position restricting section) 101e of the first group lens chamber 101 and a position 180 degrees from the position corresponding to the projection 110e. Screw holes (or prepared holes for tapping screw) are provided at positions corresponding to the screws 122 and at positions 180 degrees from the positions corresponding to each screw 122.

The first group lens chamber 101 can be fitted to the guide barrel 131 even when rotated by 180 degrees with respect to the guide barrel 131 about the optical axis. A space adjustment washer 121 for compensation for shift of focus is fitted between the first group lens chamber 101 and the guide barrel 131. A front moving frame is constituted of the first group lens chamber 101 and the guide barrel 131.

The second group lens moving frame 102 is supported at the inside of the third group lens moving frame 103. A pin 102a for transmitting focusing driving force is provided at the outer periphery of the second group lens moving frame 102. The pin 102a passes through relief grooves provided at the third lens group moving frame 103, the fourth lens group moving frame 104 and a fixed barrel 105. The pin 102a is engaged with a cam groove 106c of the second cam ring 106 and a rectilinear guide groove 107b of a focus interlocking barrel 107. The second cam ring 106 and the focus interlocking barrel 107 are described later.

The third group lens moving frame 103 supports the third lens group LB3 and is a rectilinearly moving member providing movement in a rectilinear manner along the optical axis without rotation during zooming. The third group lens moving frame 103 has a rectangular solid shaped key projection 103a formed integrally with the third group lens moving frame 103. The key projection 103a is fitted at the rectilinear guide groove 131a as described above. Costs can be reduced and tilt control of the first lens group LB1 can be achieved by forming the key projection 103a integrally with the plastic third group lens moving frame 103. A pin 3a can also be used in place of the key projection 103a as in the related lens barrel 100A, providing this does not cause any inconvenience.

The fourth group lens moving frame 104 is supported at the inside of the second cam ring 106. A pin 104a is provided at the outer periphery of the fourth group lens moving frame 104. The pin 104 engages with a cam groove 106e provided at the second cam ring 106. The fourth group lens moving frame 104 is equipped with a groove 104b provided parallel with the optical axis at an inner periphery. The groove 104b is a rectilinearly guiding groove for guiding the projections 103c and 103d of the third group lens moving frame 103 fitted into the groove 104b. The rectilinear guide groove 104b is provided at four locations on the fourth group lens moving frame 104 corresponding to the projections 3c and 3d.

The fixed barrel 105 is directly fitted to the camera body. The fixed barrel 105 is constituted of two substantial cylinders with a smaller cylinder being positioned on the inside of a large cylinder. The two substantial cylinders are formed integrally at a rear end part, i.e. on the side towards the rear along the optical axis direction. A bayonet mount 15 for connecting with the camera body is provided at a rear end part of the fixed barrel 105.

The first cam ring 120 is formed in a substantial cylinder shape and is equipped with a cam groove 120b engaging with the cam pin 131b. The first cam ring 120 is installed so as to be capable of sliding at the inner peripheral surface 105f of the large cylinder of the fixed barrel 105. The first cam ring 120 is moved forwards and backwards along the direction of the optical axis while being rotated by rotating the zoom operation ring 108. When the first cam ring 120 moves in the direction of the optical axis, the cam groove 120b has a function for increasing/reducing the amount of movement in the direction of the optical axis of the first lens group LB1 with respect to the barrel body. An amount of movement from the wide-angle end of the first lens group LB1 and the first group lens moving chamber 101 is defined by the guide groove 108a of the zoom operation ring 108, the cam groove 105e of the fixed barrel and the cam groove 120b of the first cam ring 120.

The second cam ring 106 is in the shape of a substantial cylinder. The second cam ring 106 has cam grooves 106c, 106d and 106e for causing the second group lens moving frame 102, third group lens moving frame 103 and fourth group lens moving frame 104 to move in the direction of the optical axis and for positioning.

The second cam ring 106 is held at the inner surface 105b of the inner cylinder of the fixed barrel 105 in such a manner as to be rotatable about the optical axis. A pin 106f is provided at the outer periphery of the second cam ring 106. The pin 106f engages with a cam groove 105d provided at the inner periphery of the inner cylinder of the fixed barrel 105. The second cam ring 106 is also provided with a rectilinear groove 106h with which a hook 108b projecting inside from the zoom operation ring 108 engages.

The focus interlocking barrel 107 is a cylindrical shape and is installed in such a manner as to be capable of sliding at the outer periphery 105g of the inner cylinder of the fixed barrel 105. A hook 107c is provided at the front end of the focus locking barrel 107, forward in the direction of optical axis as shown in FIG. 1. The hook 107c fits into a peripheral groove 106g of the second cam ring 106. The focus interlocking barrel 107 freely rotates about the optical axis with respect to the second cam ring 106 and moves together with the second cam ring 106 in the thrust direction. In other words, the focus interlocking barrel 107 is capable of rotation and moves integrally with the second cam ring 106 in the direction of the optical axis. The focus interlocking barrel 107 is equipped with a guide groove 107b parallel with the optical axis, in which a pin 102a is fitted. When the focus locking barrel 107 rotates, this rotation is transmitted to the second group lens moving frame 102 via the guide groove 107b and the pin 102a. On the other hand, when the focus locking barrel 107 does not rotate, the guide groove 107b functions as a rectilinear guide groove for the pin 102a.

The zoom operation ring 108 is an annular member for operating manual rotation when adjustment of the focal length is performed. The zoom operation ring 108 is fitted in a rotatable manner to the outer periphery 105c of the outer cylinder of the fixed barrel 105. A guide groove (rectilinear guide) 108a is provided parallel with the optical axis at the inner surface of the zoom operation ring 108. A pin 120a installed at the first cam ring 120 is fitted into the guide groove 108a. The zoom operation ring 108 is also provided with a hook 108b projecting into a radial direction of the cylinder. The hook 108b passes through the relief grooves 105i and 105h of the fixed barrel 105 and is fitted to the rectilinear groove 106h of the second cam ring 106.

The manual focus ring 109 is an annular member for operating manual rotation when adjusting the focal length. The manual focus ring 109 is fitted to the front end of the fixed barrel 105 and is capable of rotating about a predefined angle.

The gear member 110 is for transmitting drive force for carrying out auto focusing from a camera body (not shown) to each member. The gear member 110 is installed so as to be rotatable at the inner surface 105f of the fixed barrel 105 and meshes with a coupler and small gear (not shown). A brush member is provided at the inner periphery of the gear member 110. The brush member slides on an encoder (not shown) fitted to the fixed barrel 105 so as to detect the position of the second lens group LB2.

A spring member 111 is a compressed coil spring located between the second lens group LB2 and the third lens group LB3. The spring member 111 gives the second lens group LB2 force in a direction towards the front of the optical axis and the third lens group LB3 force in a direction towards the rear of the optical axis. Any play between the pin 102a provided at the second lens group LB2 and the cam groove 106c with which the pin 102a engages is therefore removed as a result. Further, play between the pin 103b fitted to the third lens group LB3 and the cam groove 106d with which the pin 103b engages is also removed.

An aperture interlocking plate 116 couples with a camera body interlocking plate (not shown) and transmits power of the camera body interlocking plate. The aperture interlocking plate 116 is fitted to the inner peripheral surface 105b of the fixed barrel 105b. An end part of the aperture interlocking plate 116 is connected to an aperture driving plate 113 constituted by a known aperture mechanism at the third group lens moving frame 103 and the other end is connected to the aperture ring 114.

Next, a description is given of the operation of the lens barrel 100B of the embodiment of the present invention.

First, a description is given of the focusing operation. When focusing is carried out in auto-focusing mode, a driving force in the direction of rotation is transmitted to the gear member 110 from the camera body via a public-known power transmission mechanism (not shown). This drive force is transmitted to the focus interlocking barrel 107 from the manual focus ring 109 via the pin 107a and causes the focus interlocking barrel 107 to rotate. Because the pin 102a engages with the guide groove 107b of the focus interlocking barrel 107, the pin 102a rotates in conjunction with the focus interlocking barrel 107, and moves within the cam groove 106c. As a result, the second group lens moving frame 102 moves forwards and backwards so that focusing is carried out.

On the other hand, when focusing is carried out in manual focusing mode, the manual focus ring 109 is rotated manually. As with focusing using the aforementioned auto-focusing mode, rotation of the manual focus ring 109 is converted to movement in the direction of the optical axis of the second group lens moving frame 102 so that focusing is performed.

Next a description is given of the operation performed when carrying out focal distance adjustment. A zoom operation ring 108 is manually rotated when the focal length is adjusted. When the zoom operation ring is taken to be a drive source, the first cam ring 120 and the second cam ring 106 are driven by the same drive source, and are therefore rotated together at the same angular velocity. Rotation of the zoom operation ring 108 is transmitted to the first cam ring 120 via the guide groove 108a and the pin 120a. As a result, the first cam ring 120 rotates together with the zoom operation ring 108. The pin 120a also simultaneously engages with the cam groove 105e provided at the fixed barrel 105. The first cam ring 120 therefore moves in an axial direction along the cam groove 105e while being rotated.

When the first cam ring 120 moves in the direction of the optical axis while being rotated, the guide barrel (guide frame member) 131 moves backwards and forwards without rotating. The cam pin 131b of the guide barrel 131 is fitted in the cam groove 120b. A key projection 103a is fitted in a slidable manner into the rectilinear guide groove (rectilinear guide member) 131a of the guide barrel 131. Rotation of the guide barrel 131 is therefore limited. The first lens group LB1 and the first group lens chamber 101 fitted to the guide barrel 131 also move backwards and forwards along the direction of the optical axis without rotating, as with the guide barrel 131. A description of the key projection 103a is given later.

Rotation of the zoom operation ring 108 is also transmitted to the rectilinear groove 106h of the second cam ring 106 via a hook 108b passing through the relief grooves 105i and 105h of the fixed barrel 105. As a result, the second cam ring 106 rotates together with the zoom operation ring 108.

Rotation of the second cam ring 106 is converted to reciprocating movement in the direction of the optical axis by the cam groove 106c and pin 102a, the cam groove 106d and the pin 103b, and the cam groove 106e and pin 104a. As a result, a moving frame 102 of the second lens group LB2, a moving frame 103 of the third lens group LB3 and a moving frame 104 of the fourth lens group LB4 do not rotate and there is movement towards the front and rear along the direction of the optical axis.

The amount of movement of the second group lens moving frame 102 is an amount composed of an amount of movement decided by the cam groove 105d and an amount of movement decided by the cam groove 106c. The amount of movement of the third group lens moving frame 103 is an amount composed of an amount of movement decided by the cam groove 105d and an amount of movement decided by the cam groove 106d. The amount of movement of the fourth group lens moving frame 104 is an amount composed of an amount of movement decided by the cam groove 105d and an amount of movement decided by the cam groove 106e.

Figure 2:
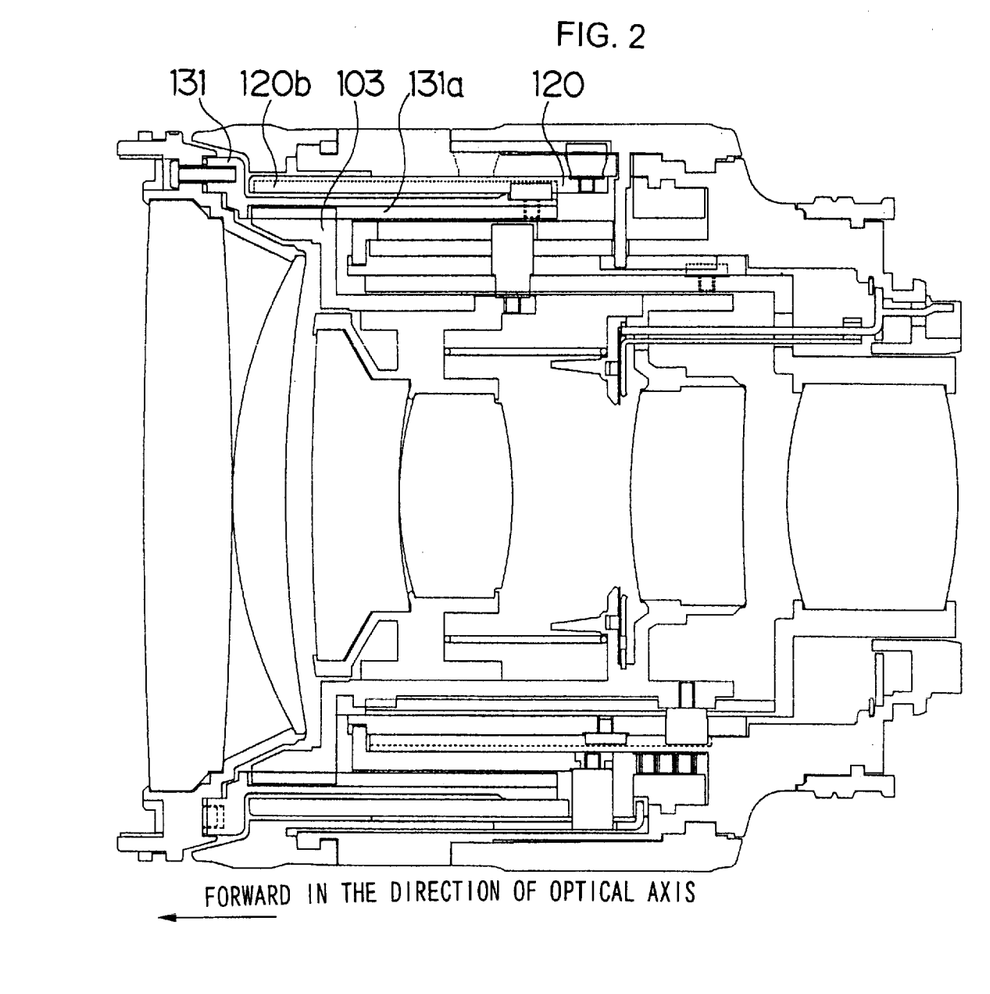
FIG. 2 is a cross-sectional view at a wide angle end of the lens barrel 100B of the embodiment of the present invention.

FIG. 2 is a cross-sectional view of a wide angle end of the lens barrel 100B of the embodiment of the present invention.

As described above, the lens barrel 100B of the embodiment of the present invention is a lens barrel with a high zoom ratio and high magnification factor. The stroke length by which the first lens group LB1, first group lens chamber 101 and guide barrel 131 move when adjusting the focal length is extremely long. Rotation of the guide barrel 131 therefore cannot be limited by a fixed member that does not move in the direction of the optical axis because the guide barrel 131 moves further than the fixed member.

The third group lens moving frame 103 of the lens barrel 100B moves forwards and backwards along the direction of the optical axis without rotating during focal length adjustment as described above. The key projection 103a is provided at the third group lens moving frame 103 in this embodiment of the present invention. The position of the key projection 103a of the wide angled end shown in FIG. 2 is shown by the broken line (103a–w), in FIG. 1 showing the telescopic end. The key projection 103a, i.e. the third group lens moving frame 103 moves forwards and backwards along the direction of the optical axis in response to the focal length. A small type lens barrel where the first lens group LB1, first group lens chamber 101 and guide barrel 131 move without rotating even for high magnification zoom lenses as a result of limiting the rotation of the guide barrel 131 using the key projection 103a can therefore be implemented.

The lens barrel of the present invention is by no means limited to the embodiment described above, and various modifications and changes are possible without deviating from the scope of the present invention. For example, in the embodiment described above, the present invention is applied to an interchangeable lens of an interchangeable lens type camera, but the present invention may also be applied to a non-interchangeable lens-type lens barrel. Further, an example is given where the first group lens chamber 101 and the guide barrel 131 are provided separately but, for example, the first group lens chamber 101 and the guide barrel 131 may be formed integrally and taken as the front moving frame.

Further, in the above embodiment, an example is given of performing focal length adjustment by manually operating a zoom operation ring 108 but focal length adjustment may also be carried out using an electrically powered zoom. In this case, the first cam ring 120 and the second cam ring 106 are driven by a drive source provided at the camera body (not shown) and therefore rotate together. This means that the same results as for when the zoom operation ring 108 is operated manually can be obtained.

According to the embodiment of the present invention, cam mechanisms for driving each lens group are installed so as to be divided between the first cam ring 120 and the second cam ring 106. This means that the portion of thickness P present in the lens barrel 100A of the related art as shown in FIG. 3 is no longer required. The diameter of the lens barrel is therefore made thin so that the lens barrel can be miniaturized. Moreover, the first cam ring 120 and second cam ring 106 can therefore be manufactured in a straightforward manner and can be formed in a substantially cylindrical simple shape, which means that high-precision parts can be manufactured at a low cost.

A key projection 103a is provided at the third group lens moving frame 103 that moves in a straight line during focal length adjustment and this is taken to be a rectilinear guide for limiting rotation of the guide barrel 131. As a result, the first lens group LB1, first group lens chamber 101 and guide barrel 131 can be made to not rotate even for high magnification factor zoom lenses. As a result, when a polarizing filter is used, it is no longer necessary to adjust the angle of a polarizing filter whenever the focal length is adjusted, which precipitates ease of use. It is also possible to use a flower-shaped hood capable of effectively blocking detrimental light. Optical performance, for example, resolving power of whole of the lens barrel that is stable regardless of the focal length can be obtained.

The first group lens moving chamber supporting the first lens group LB1 can be fitted to the guide barrel 131 even when rotated by 180 degrees with respect to the guide barrel 131 about the optical axis. As a result, when the properties of each lens constituting the lens barrel are not even and the optical characteristics of the whole of the lens barrel are poor, the first lens group LB1 and the first group lens moving chamber 101 are fitted to the guide barrel 131 rotated by 180 degrees so as to attempt improving the optical characteristics of the whole of the lens barrel. When a flower-shaped hood is fitted as an accessory, it is possible to use the flower-shaped hood in the same manner even when the first lens group LB1 and the first group lens moving chamber 101 are rotated by 180 degrees because the flower-shaped hood can be used even rotated by 180 degrees.

The front moving frame composed of the first group lens moving chamber 101 and the guide barrel 131 is moved to a position where there is no overlapping with portions that do not move towards the front and rear during zooming, i.e. can be extended in the direction of the optical axis to a position further away than portions that do not move. This means that a zoom lens of an extremely high magnification factor can be realized even when the lens barrel itself is short and small.

The third group lens moving frame 103 is a rectilinear moving member equipped with the key projection 103a and therefore supports a lens group different from the front lens group LB1 and the internal focusing lens group LB2. This means that existing parts can be used as rectilinear moving members. As a result, the lens barrel can be manufactured at a low cost.

The focus interlocking barrel 107 is fitted to the fixed barrel 105 so as to be slidable and the focusing and zooming operations described above behave in the two ways described in the following. During focusing, the focus interlocking barrel 107 rotates around the optical axis with respect to the second cam ring 106 and transmits a drive force to the internal focusing lens group LB2. During zooming, the focus interlocking barrel 107 moves with the second cam ring 106 but also acts as a rectilinear guide for limiting the rotation of the internal focusing lens group LB2 without rotating. As a result, even if a cam ring constituted by a single member in the apparatus of the related art is divided into two, drive force from the drive sources can be transmitted to each lens group.

The first cam ring 120 is fitted in a rotatable manner in the fixed barrel 105. An engaging member 120a of the first cam ring 120 then engages with the cam groove 105e of the fixed barrel, engages with the rectilinear guide 108a of the zoom operation ring 108 and receives a rotating force so as to move. As a result, the first cam ring 120 can move in a reliable manner taking the fixed barrel 105 as a reference.

The zoom operation ring 108 has a hook 108b engaging with the rectilinear groove 106h of the second cam ring 106 and transmitting rotational force to the second cam ring. The second cam ring 106 can therefore move accurately together with the first cam ring 120.

What is claimed is:

1. A lens barrel comprising:
   a front lens group facing a subject, and moving only during zooming;
   an internal focusing lens group that is constituted by a lens group different from said front lens group, and moves at least during focusing;
   a first cam ring having a cam groove for causing said front lens group to move; and
   a second cam ring, separate from said first cam ring, that is driven by a same drive source as said first cam ring, rotates together with said first cam ring, and has a cam groove for causing lens groups other than said front lens group to move.

2. The lens barrel according to claim 1, further comprising:
   a front moving frame that supports said front lens group; and
   a rectilinear moving member that guides said front moving frame in a rectilinear manner, and provides rectilinear movement without rotation during zooming.

3. The lens barrel according to claim 2, wherein;
   said front moving frame moves as a result of zooming to a position where there is no overlapping with a member that does not move during zooming.

4. The lens barrel according to claim 2, wherein;
   said rectilinear moving member is a moving frame that supports a lens group different from said front lens group and said internal focusing lens group.

5. The lens barrel according to claim 3, wherein;
   said rectilinear moving member is a moving frame that supports a lens group different from said front lens group and said internal focusing lens group.

6. The lens barrel according to claim 1, further comprising:
   a fixed barrel that does not move during operation; and
   a focus interlocking barrel constituted by a cylindrical member, that is provided in such a manner as to fit in a slidable manner with said fixed barrel, freely rotate about the optical axis with respect to said second cam ring, and move together with said second cam ring in a thrust direction, and transmits driving power to said internal focusing lens group by rotation about the optical axis during focusing, and limits rotation of said internal focusing lens group without rotating during zooming so as to provide rectilinear guidance.

7. The lens barrel according to claim 1, further comprising:
   a fixed barrel that does not move during operation;
   a zoom operation ring that is fitted in a rotatable manner to the outer periphery of said fixed barrel, has a rectilinear guide at an inner periphery, and is operated during zooming; wherein;
   said fixed barrel is provided with a cam groove, and
   said first cam ring fits with said fixed barrel in a rotating manner, and has an engaging member that engages with said cam groove of said fixed barrel, and engages with said rectilinear guide of said zoom operation ring so as to move by receiving rotating force of said zoom operation ring.

8. The lens barrel according to claim 6, further comprising:
   a zoom operation ring that is fitted in a rotatable manner to an outer periphery of said fixed barrel, has a rectilinear guide at an inner periphery, and is operated during zooming; wherein;
   said fixed barrel is provided with a cam groove, and
   said first cam ring fits with said fixed barrel in a rotating manner, and has an engaging member that engages with said cam groove of said fixed barrel, and engages with said rectilinear guide of said zoom operation ring so as to move by receiving rotating force of said zoom operation ring.

9. The lens barrel according to claim 7, wherein;
   said second cam ring comprises a rectilinear groove; and
   said zoom operation ring has a hook that engages with said rectilinear groove of said second cam ring, and transmits rotational force to said second cam ring.

10. The lens barrel according to claim 8, wherein;
    said second cam ring comprises a rectilinear groove; and
    said zoom operation ring has a hook that engages with said rectilinear groove of said second cam ring, and transmits rotational force to said second cam ring.

11. The lens barrel according to claim 2, wherein;
    said front moving frame comprises a guide frame member having a rectilinear guide member engaging with said rectilinearly moving member, filter fitting screws and/or an accessory fitting member, and a front lens group supporting member for supporting said front lens group;
    said guide frame member and said front lens group support member comprises a position restricting member for limiting a fitting position of said front lens group support member with respect to said guide frame member; and
    said position restricting member is provided at a position corresponding to said guide frame member and a position rotated centrally about the optical axis from the position corresponding to said guide frame member, and limits the fitting position of said front lens group supporting member with respect to said guide frame member.

12. The lens barrel according to claim 11, wherein;
    said position restricting member is provided at a position corresponding to said guide frame member and a position rotated centrally by 180 degrees about the optical axis from the position corresponding to said guide frame member, and limits the fitting position of said front lens group supporting member with respect to said guide frame member.

13. The lens barrel according to claim 11, wherein;
    an accessory fitted to said accessory fitting member is a flower-shaped hood.

14. A lens barrel comprising:
    a front lens group facing a subject, and moving only during zooming;
    an internal focusing lens group that is constituted by a lens group different from said front lens group, and moves at least during focusing;
    a first cam ring having a cam groove for causing said front lens group to move;
    a second cam ring separate from said first cam ring, that is driven by a same drive source as said first cam ring, rotates together with said first cam ring, and has a cam groove for causing lens groups other than said front lens group to move;
    a front moving frame that supports said front lens group;
    a rectilinear moving member that guides said front moving frame in a rectilinear manner, and provides rectilinear movement without rotation during zooming;
    a fixed barrel that does not move during operation;
    a focus interlocking barrel constituted by a cylindrical member, that is provided in such a manner as to fit with said fixed barrel, freely rotate about an optical axis with respect to said second cam ring, and move together with said second cam ring in a thrust direction, and transmits driving power to said internal focusing group by rotation about the optical axis during focusing, and limits rotation of said internal focusing lens group without rotating during zooming so as to provide rectilinear guidance; and
    a zoom operation ring that is fitted in a rotatable manner to an outer periphery of said fixed barrel, has a rectilinear guide at an inner periphery, and is operated during zooming; wherein;
    said second cam ring comprises a rectilinear groove;
    said zoom operation ring has a hook that engages with said rectilinear groove of said second cam ring, and transmits rotational force to said second cam ring;
    said front moving frame moves as a result of zooming to a position where there is no overlapping with a member that does not move during zooming; and
    said rectilinear moving member is a moving frame for supporting a lens group different from said front lens group and said internal focusing lens group.

15. A lens barrel comprising:
    a front lens group facing a subject, and moving only during zooming;
    an internal focusing lens group that is constituted by a lens group different from said front lens group, and moves at least during focusing;
    a first cam ring having a cam groove for causing said front lens group to move;
    a second cam ring separate from said first cam ring, that is driven by a same drive source as said first cam ring, rotates together with said first cam ring, and has a cam groove for causing lens groups other than said front lens group to move;
    a front moving frame that supports said front lens group, and moves as a result of zooming to a position where there is no overlapping with a member that does not move during zooming;
    a rectilinear moving member that guides said front moving frame in a rectilinear manner, and provides rectilinear movement without rotation during zooming;

a fixed barrel that does not move during operation;

a focus interlocking barrel constituted by a cylindrical member, that is provided in such a manner as to fit with said fixed barrel, freely rotate about an optical axis with respect to said second cam ring, and move together with said second cam ring in a thrust direction, and transmits driving power to said internal focusing group by rotation about the optical axis during focusing, and limits rotation of said internal focusing lens group without rotating during zooming so as to provide rectilinear guidance;

a zoom operation ring that is fitted in a rotatable manner to an outer periphery of said fixed barrel, has a rectilinear guide at an inner periphery, and is operated during zooming; wherein;

said second cam ring comprises a rectilinear groove;

said zoom operation ring has a hook that engages with said rectilinear groove of said second cam ring, and transmits rotational force to said second cam ring;

said rectilinear moving member is a moving frame that supports a lens group different from said front lens group and said internal focusing lens group;

said front moving frame comprises a guide frame member having a rectilinear guide member engaging with said rectilinearly moving member, filter fitting screws and/or an accessory fitting member, and a front lens group supporting member for supporting said front lens group;

said guide frame member and said front lens group support member comprise a position restricting member for restricting a fitting position of said front lens group support member with respect to said guide frame member; and said position restricting member is provided at a position corresponding to said guide frame member and a position rotated centrally about the optical axis from the position corresponding to said guide frame member, and limits the position of fitting said front lens group supporting member with respect to said guide frame member.

* * * * *